Nov. 7, 1933.                    A. L. DE LEEUW                    1,934,044
                                DRILLING MACHINE
                              Filed Oct. 9, 1931              2 Sheets-Sheet 1
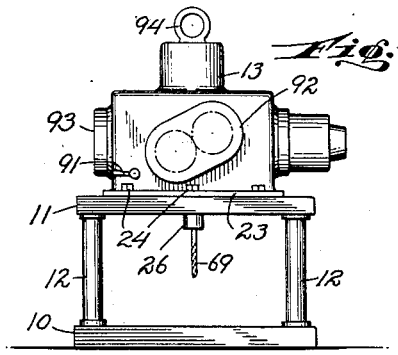
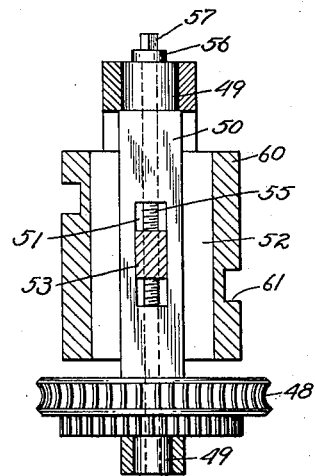
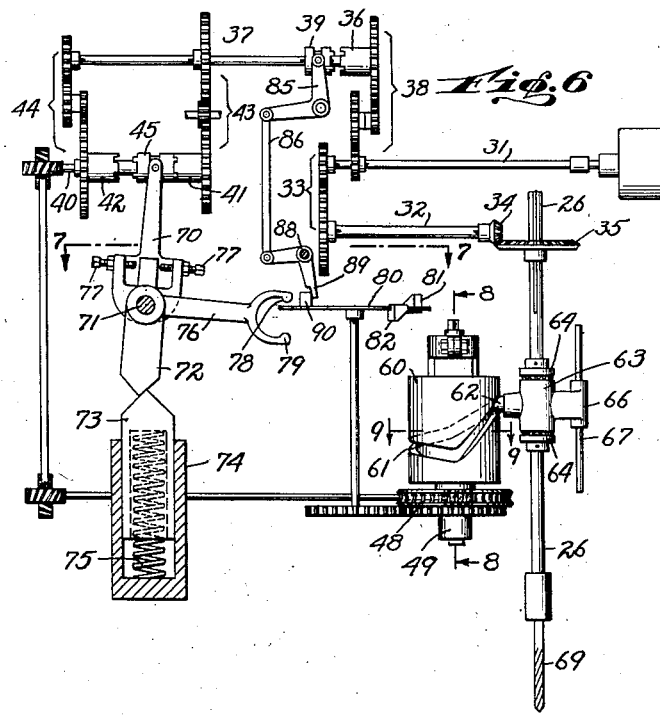
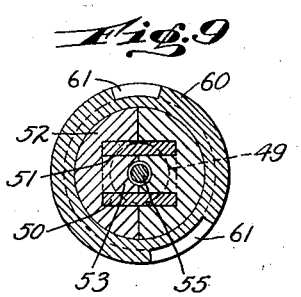
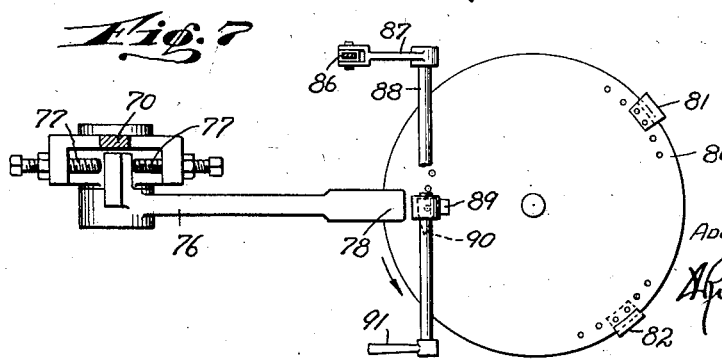
INVENTOR.
ADOLPH L. DE LEEUW.
ATTORNEY.

Nov. 7, 1933.  A. L. DE LEEUW  1,934,044
DRILLING MACHINE
Filed Oct. 9, 1931    2 Sheets-Sheet 2
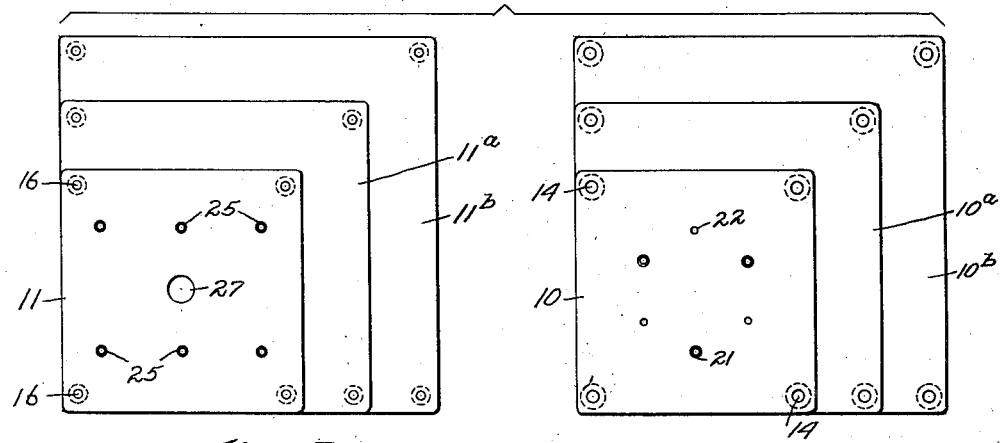
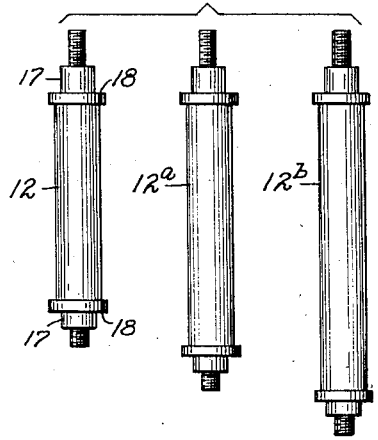
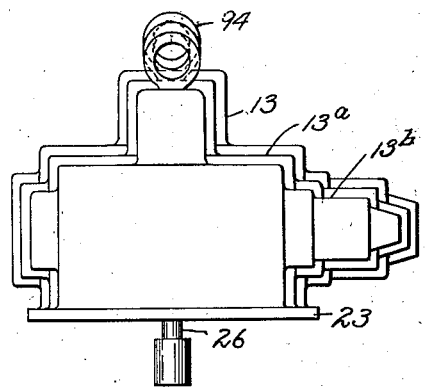
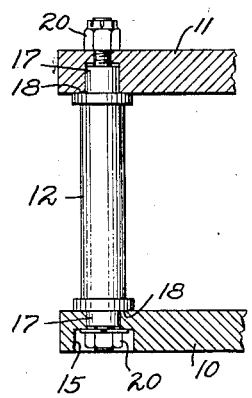
INVENTOR.
ADOLPH L. DE LEEUW.
BY
ATTORNEY Patented Nov. 7, 1933

1,934,044

UNITED STATES PATENT OFFICE 1,934,044

DRILLING MACHINE

Adolph L. De Leeuw, Plainfield, N. J.

Application October 9, 1931. Serial No. 570,071

9 Claims. (Cl. 77—5)

My invention relates to drilling machines and has for an object to provide a machine tool of this class which is particularly adapted for use in quantity production.

Another object of the invention is to provide a drilling machine in which the main spindle is centered with respect to its supports so that there will be no unbalanced force tending to spring the tool out of alignment.

It has been the practice heretofore to build a drilling machine with a goose-neck column supporting the drill head centrally over the work table and yet providing clearance for the work. Obviously the work could then overhang the table in any direction except that obstructed by the column. However there are decided disadvantages in the use of a goose-neck column. The thrust of the tool which may run into many thousands of pounds, exerts a powerful moment on the offset support, and the latter must be of massive and rigid construction to prevent it from giving under the stress. Even at best, the unbalanced forces will cause the column to spring slightly, with the result that an imperfect bore is drilled, and the cutting edge of the tool is dulled.

This unmechanical design of drilling machines is a heritage of by-gone days. Before the advent of quantity production, a drilling machine was a general-utility tool. The work it had to do was quite varied; the same machine was used for drilling large pieces and small, for drilling deep holes and shallow, and it had to be powered for the heaviest work it might be called upon to do. Modern production methods on the other hand require no such range of capacity. Where parts are reproduced in large quantities, a machine may run at a fixed setting for weeks, months, and even years. Usually the work is held in a jig which is mounted on and dowelled to the work table and in some cases rather than to disturb a highly accurate setting by dismantling the jig, the machine may be allowed to stand idle for a whole season or until there is demand for another run of the same part.

My invention contemplates the elimination of the bulky and costly general-purpose drilling machine in quantity production, by providing a special-purpose machine, i. e., a machine which is especially adapted to the work it is to handle.

Another object of my invention is to provide a drilling machine whose capacity may be adjusted at will, so that, after a run on one product, the machine may be expanded or contracted to handle a run of work of different dimensions and/or to drill holes of widely different size.

To this end I build my improved drilling machine in sections or units which may be readily assembled and disassembled. By providing a number of interchangeable sizes of each unit, it is possible to assemble them in various combinations. The number of different sizes of drilling machines that can be assembled will be equal to the product of the various sizes of units; for example, if the machine is built up of three units—one controlling vertical clearance for the work, another horizontal clearance, and the third the spindle drive, and if three sizes of each unit are kept in stock, it will be possible to assemble the drilling machine in any one of twenty-seven different sizes.

Another object of the invention is to overcome the disadvantages of the goose-neck construction by providing a plurality of columns to support the drill head, with the axis of the main spindle substantially centered with respect to said columns (or certain of said columns), so that there will be no tendency for the parts to spring out of alignment. The columns will then be under tension while the tool is cutting into the work, and they will not be subjected to any bending stresses. Consequently, the columns may be made very light, thereby reducing the bulk, weight, and cost of the machine. Since the machine is assembled for a specific size or class of work it will take up no more space in the shop than is absolutely necessary for the work that it has to do.

Another object of the invention is to provide, as one of the removable units of a drilling machine, a self-contained drill head. In other words, the spindle, the driving mechanism therefor, and means for automatically controlling the feed and rotation of the spindle are assembled in a unitary structure which is detachable from the rest of the machine.

Other objects of my invention will appear in the following description of a preferred embodiment and thereafter the novelty and scope of the invention will be pointed out in the claims.

In the drawings,

Figure 1 is a view in side elevation of an assembled drilling machine;

Figure 2 is a plan view of one of the units of the machine, said unit comprising a base plate and a top plate, each being shown in several different sizes;

Figure 3 is a view in side elevation of a column shown in three sizes and constituting a part of another unit of the machine;

Figure 4 is a view in side elevation of a self-contained drill head, also shown in three different sizes, and constituting still another unit of the machine;

Figure 5 is a detail view illustrating the manner in which the base plate and top plate are connected to one of the columns;

Figure 6 is a somewhat diagrammatic view illustrating the mechanism for driving and controlling the operation of the spindle of the machine;

Figure 7 is a view in section taken on the line 7—7 of Fig. 6 and showing certain mechanism for controlling the feed of the spindle;

Figure 8 is a view in section taken on the line 8—8 of Fig. 6 and showing an adjustable mounting for a feed cam; and Figure 9 is a view in transverse section of said cam and mounting, the section being taken on the line 9—9 of Fig. 6.

The drilling machine shown in the drawings comprises three separable units, each of which may be supplied in any desired number of sizes. The first unit, as shown in Fig. 2, consists of a bottom plate 10 and a top plate 11; the second unit consists of a set of columns 12, and the third unit of a drill head 13. The first two units constitute the supporting frame for the drill head.

The bottom plate 10 is preferably rectangular and is formed with a hole 14 near each corner, each hole being counter-bored on the underside as shown at 15 in Fig. 5. The top plate 11 is preferably of the same shape as the plate 10 and is formed with holes 16 adapted to register with the holes 14. These plates are connected and supported in spaced relation by a set of the columns 12. Each column is formed with end portions 17 adapted to fit snugly in the holes 14 and 16 and with shoulders 18 adapted to seat against opposed faces of the plates 10 and 11 respectively. The outer extremities of the portions 17 are threaded to receive clamping nuts 20, whereby the columns may be securely clamped to the plates 10 and 11. The supporting frame of the machine thus comprises two plates secured in spaced relation by means of a plurality of columns and, although in the particular embodiment illustrated there are four supporting columns, obviously the number can be varied as desired.

The bottom plate 10 serves as a work table and may be formed with T-slots (not shown) to receive clamps for fastening the work to the table. However, in most cases the work will be held in a jig bolted and dowelled to the base plate. Such bolt and dowel holes are indicated at 21 and 22 respectively in Fig. 2.

The frame may be expanded or contracted horizontally by using plates of different size and vertically by using columns of different length. Thus, in Fig. 2, I show three sets of base plates 10, 10a and 10b, and three sets of top plates 11, 11a, and 11b. The holes near the corners of the different sized plates are of uniform size so that the plates are interchangeable and may be secured to any set of columns 12. Also the columns may be of different length, as shown in Fig. 3, where three columns are indicated at 12, 12a, and 12b.

The drill head may be made in different sizes, as indicated at 13, 13a, and 13b in Fig. 4. However, all of the drill heads have the same sized base 23 so that they will be interchangeable and may be secured to any frame assembly. The drill head is secured to the top plate of the frame by means of bolts 24. Bolt holes 25 of standard size and position are provided in each of the top plates to receive the bolts 24. The main spindle 26 depends from the drill head and passes through an aperture 27 in the center of the top plate.

The mechanism of the drill head may vary according to requirements, but a typical arrangement is illustrated in Fig. 6. The drill head preferably carries its own motor 30 which drives a main shaft 31. Another shaft 32 is driven by the main shaft through a set of pick-off gears 33. A bevel pinion 34 fixed upon a shaft 32 meshes with a bevel gear 35 splined upon the spindle 26. The spindle is thereby rotated at a speed determined by the ratio of said pick-off gears.

A clutch member 36 journaled to rotate freely on a shaft 37 is driven from the main shaft through a train of speed reduction gears 38. The member 36 is toothed and is adapted to mesh with another toothed clutch member 39 splined upon the shaft 37. Means are provided for sliding the clutch member 39 into and out of engagement with the member 36 whenever desired. This means, however, will be described hereinafter.

Another shaft 40 has a pair of toothed clutch members 41 and 42, respectively, journaled thereon. The clutch member 41 is driven from the shaft 37 at a relatively high speed by a gear train 43, while the other clutch member 42 is driven at a reduced speed by a gear train 44 which includes a set of pick-off gears. Splined upon the shaft 40 is double clutch member 45 having teeth at each end thereof. This double clutch member may be moved into engagement with the member 41 to drive the shaft 40 at high speed or into engagement with the member 42 to drive the shaft 40 at low speed. Through a suitable gear train the shaft 40 drives a worm-gear 48 fixed upon a cam shaft 49 mounted adjacent and parallel to the spindle 25.

As shown in Figs. 8 and 9 the cam shaft is formed with an intermediate portion 50 of rectangular section which is penetrated by a slot 51. A split arbor 52 formed of two semi-cylindrical sections is mounted on the cam shaft. These sections are formed in their adjacent faces with longitudinal grooves which fit and slide upon the angular portion 50 of the cam shaft. The arbor sections are also formed with lugs 53 which enter the slot 51 from opposite sides and meet to form a split nut having threaded engagement with an adjusting screw 55. The latter is located in a central bore in the shaft 49 and is journaled in the upper portion of said bore, being formed with a flange 56 that rests on the upper end of the shaft. The arbor is thus suspended on the cam shaft and may be adjusted up or down by turning the screw 55. The projecting end 57 of the screw may be squared for the application of a wrench, and the flange 56 and upper end of the cam shaft may be graduated so that the position of the arbor may be adjusted to a nicety.

Fitted upon the arbor 52 and fixed thereto in any suitable manner, is a cylindrical cam 60 formed with a cam groove 61. A roller 62 engages this groove and is carried by a block 63 journalled on the spindle 25. A pair of collars 64 fixed upon the spindle 25 prevent axial movement of the block 63 with respect to the spindle. Ball bearings may be provided between the block and the collars, and an extension 66 of the block which has sliding engagement with a vertical guide rod 67, prevents the block from turning and swinging the collar 62 out of the cam groove.

The cam 60 controls the vertical reciprocation or feed of the spindle. Said cam may be driven at high speed or low speed depending upon which of the clutch members 41 and 42 is in mesh with the clutch member 45. The tool 69 carried by the spindle should preferably be fed downward at a comparatively high speed until it is about to bite into the work, then while cutting it should run comparatively slowly. Finally, the return stroke of the tool should take place at high speed. Means are provided for automatically shifting the clutch member 45 to effect these speed variations, as will now be explained.

A clutch lever 70 is pivoted on a stud 71 and has one arm formed with a yoke engaging the member 45 while its opposite arm 72 terminates in a point. A plunger 73 is mounted to slide in a socket member 74 and has a chisel point which engages the pointed end of the arm 72. A spring 75 urges the plunger outward, tending to wedge the arm 72 to one side or the other depending upon which side of the point of said arm is engaged by the plunger point. The spring therefore tends to force the clutch member 45 into positive engagement with the members 41 or 42 and prevents the parts from dragging with the teeth of the clutch member 45 only partially meshing with the teeth of the members 41 or 42. The clutch lever 70 is operated by a bell crank lever 76 also pivoted on the stud 71. One arm of the lever 76 plays between a pair of opposed set screws 77 carried by the lever 70, while the other arm of the lever 76 terminates in a pair of fingers 78 and 79 which span the edge of a control disc 80. The latter is driven through suitable gearing from the shaft 49 at the same speed as the cam 60. Clamped upon the edge of the disc 80 are two dogs 81 and 82 respectively. The upper face of the dog 81 is upwardly inclined so that upon striking the finger 78 it will raise the same and tilt the bell crank lever 76 counter-clockwise, as viewed in Fig. 6. This will throw the clutch member 45 toward the left, and at first the plunger 73 will be depressed by the arm 72, but, as soon as the point of said arm slips over the chisel point of the plunger the spring 75 will cause the member 45 to spring into mesh with the slow speed clutch member 42. The other dog 82 has its lower face downwardly inclined so that, when it strikes the finger 79, it will depress the same and swing the bell crank lever in the opposite direction to shift to high-speed.

The feed of the tool 69 is started or stopped by throwing the clutch member 39 into or out of mesh with the member 36. This clutch is disengaged automatically at the end of the return stroke of the spindle, after which it may be manually re-engaged. A bell crank lever 85 has one arm operatively engaging the member 39 while the other arm is connected by a link 86 to crank 87 on a transverse shaft 88. Another crank 89 depends from the shaft 88 in the path of a wedge 90 which may be clamped at any desired position on the disc 80 as shown in Fig. 7. This wedge is so positioned as to swing the crank 89 counter-clockwise, thereby moving the clutch member 39 out of engagement with clutch member 37 and stopping the rotation of the cam shaft 49. However, the momentum of the parts will be sufficient to carry the wedge 90 clear of the crank 89 before the control disc 80 is stopped. A handle 91 is fixed upon the shaft 88 and may be operated to throw the clutch member 39 into engagement with the member 36 whenever it is desired to start the feed of the spindle. This handle also permits of manually controlling the clutch 36—39 at any time.

The mechanism of the drive head is all suitably enclosed in a casing, as illustrated in Figs. 1 and 4. The casing is furnished with doors 92 and 93 which give access to the pick-off gears 38 and 44 respectively. The end of the shaft 88 bearing the handle 91 projects through the casing at a convenient point. The top of the casing is formed with an eye 93 to receive the hook of a hoist or a crane when dismantling or assembling the machine or when changing the location of the machine.

When a drilling machine is assembled, a pair of base plates 10 and 11 is selected which will provide sufficient horizontal clearance for the work to be drilled, and also a set of columns which will provide a sufficient vertical clearance. Then a drill head is selected which has as the requisite spindle travel and power drive. The selected parts are then bolted together to form a complete drilling machine which is especially adapted for the work to be done. Obviously the cam 60 may be removed from its arbor and replaced with another. However, such a replacement will seldom be required. The stroke of the spindle may be adjusted vertically by turning the screw 55. This adjustment will be necessary for frames of different column size, as well as for different classes of work, to control the lower limit of travel of the tool. The dog 81 is then set at the right point on the disc 80 to shift the feed to low speed just before the tool enters the work, and the dog 82 is set to shift to high speed on the return stroke of the spindle. The wedge 90, although adjustable on the control disc, usually occupies a set position thereon since it is seldom desirable to stop the spindle-feeding mechanism at any point other than at the end of the return stroke of the tool.

It will be noted that the machine may very quickly be dismantled and reassembled in a different size or capacity whenever desired. The jig by which the work is held to the work table need not be removed from said table at the end of a run, since the work table itself may be unbolted from the machine and replaced with another. A desired setting of the jig may thus be preserved for use when the same character of work is to be repeated.

While I have described a preferred embodiment of my invention, this is to be taken as illustrative and not limitative, and I wish it to be understood that variations and changes may be made in form, construction and arrangement of various parts without departing from the spirit and scope of my invention.

I claim:

1. A knock-down drilling machine comprising a base plate, a top plate, columns connecting the plates at predetermined spacing and removable therefrom to permit substitution of columns of different length to provide a greater or lesser spacing, and a drill driving and feeding unit adapted to operate on work between the plates, said unit being secured to the top plate but being removable therefrom to permit substitution of another unit of different drilling capacity.

2. A knock-down drilling machine comprising a base plate, a top plate, columns connecting the plates at predetermined spacing and removable therefrom to permit substitution of columns of different length to provide a greater or lesser spacing, and a drill driving and feeding unit adapted to operate on work between the plates, said unit being secured to the top plate but being removable therefrom to permit substitution of another unit of different drilling capacity, the drilling axis of said unit being symmetrically disposed with respect to the columns.

3. A knock-down drilling machine comprising a base plate, a top plate, columns connecting the plates at predetermined spacing and removable therefrom to permit substitution of columns of different length to provide a greater or lesser spacing, and a drill driving and feeding unit adapted to operate on work between the plates, said unit being secured to the top plate but being removable therefrom to permit substitution of another unit of different drilling capacity, the drilling axis of said unit being centered with respect to the columns.

4. A knock-down drilling machine comprising a base plate, a top plate, a set of more than two columns connecting the plates at predetermined spacing and removable therefrom to permit substitution of columns of different length to provide a greater or lesser spacing, and a drill driving and feeding unit adapted to operate on work between the plates with the drilling axis of the unit centered with respect to the columns, said unit being secured to the top plate but being removable therefrom to permit substitution of another unit of different drilling capacity.

5. A knock-down drilling machine comprising a bottom plate formed with attachment openings for affixing a piece of work directly thereto, a top plate, columns connecting the plates at predetermined spacing and removable therefrom to permit substitution of columns of different length to provide a greater or lesser spacing between the plates, and a drill driving and feeding unit adapted to operate on the work with the drilling axis of the unit centered with respect to the columns, said unit being secured to the top plate but being removable therefrom to permit substitution of another unit of different drilling capacity.

6. A knock-down drilling machine comprising a base plate adapted to support a piece of work, a top plate, a set of vertical columns connecting the plates at predetermined vertical spacing, the plates being formed with sockets in which the columns are detachably secured whereby the plates may be removed for substitution of plates of different size and of different spacing between sockets to provide a greater or lesser horizontal clearance between the columns, and a drill driving and feeding unit adapted to operate on said work, said unit being secured to the top plate but being removable therefrom to permit of attachment to a top plate of another size or to permit of substitution of another unit of different drilling capacity.

7. A knock-down drilling machine comprising a base plate adapted to support a piece of work, a top plate, a set of vertical columns connecting the plates at predetermined vertical spacing, the plates being formed with sockets in which the columns are detachably secured whereby the plates may be removed for substitution of plates of different size and of different spacing between sockets to provide a greater or lesser horizontal clearance between the columns, and a drill driving and feeding unit adapted to operate on said work, said unit being secured to the top plate with its drilling axis centered with respect to the columns but being removable therefrom to permit of attachment to a top plate of another size or to permit of substitution of another unit of different drilling capacity.

8. A knock-down drilling machine comprising a top plate, a base plate, a set of columns connecting the plates in spaced relation, means detachably securing each column to each plate, and a drill driving and feeding unit detachably mounted on the top plate and adapted to operate on work between the plates with the drilling axis of the unit centered between the columns, each plate being formed with uniform cylindrical apertures to receive the columns, each column being formed with cylindrical end portions to fit accurately into said apertures and with accurately spaced shoulders to bear firmly against the plates respectively and preserve uniform spacing thereof, whereby in assembling the machine the columns will be interchangeable as to position or they may be replaced with another set of colmns of different length between bearing shoulders to increase or decrease the spacing between the plates.

9. A knock-down drilling machine comprising a top plate, a base plate, a set of columns connecting the plates in spaced relation, means detachably securing each column to each plate, and a drill driving and feeding unit mounted on the top plate and adapted to operate on work between the plates with the drilling axis of the unit centered between the columns, each plate being formed with uniform cylindrical apertures to receive the columns, each column being formed with cylindrical end portions to fit accurately into said apertures and with accurately spaced shoulders to bear firmly against the plates respectively and preserve uniform spacing thereof, whereby in assembling the machine the columns will be interchangeable as to position or they may be replaced with another set of columns of different length between bearing shoulders to increase or decrease the spacing between the plates, said drill driving and feeding unit being also removably mounted on the top plate to permit substitution of another unit of different drilling capacity.

ADOLPH L. DE LEEUW.